US012563043B2

(12) United States Patent
Istomin et al.

(10) Patent No.: US 12,563,043 B2
(45) Date of Patent: Feb. 24, 2026

(54) UNIVERSAL CONCEPTUAL CONTROL MANAGEMENT

(71) Applicant: AT&T Intellectual Property I, L.P., Atlanta, GA (US)

(72) Inventors: Mikhail Istomin, Brooklyn, NY (US); Wei Wang, Harrison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 212 days.

(21) Appl. No.: 18/089,890

(22) Filed: Dec. 28, 2022

(65) Prior Publication Data

US 2024/0223567 A1 Jul. 4, 2024

(51) Int. Cl.
*H04L 9/40* (2022.01)

(52) U.S. Cl.
CPC .......... *H04L 63/102* (2013.01); *H04L 63/105* (2013.01)

(58) Field of Classification Search
CPC ............................ H04L 63/102; H04L 63/105
See application file for complete search history.

(56) References Cited

U.S. PATENT DOCUMENTS

| | | | | |
|---|---|---|---|---|
| 7,552,358 B1* | 6/2009 | Asgar-Deen | ........ | G06F 11/1435 714/15 |
| 10,673,863 B2* | 6/2020 | Lemay | .................. | H04L 63/105 |
| 2017/0063816 A1* | 3/2017 | Ackerly | ............. | H04L 63/0428 |
| 2018/0145880 A1* | 5/2018 | Choi | ..................... | H04L 41/044 |
| 2019/0334893 A1* | 10/2019 | Chen | ................. | H04W 92/12 |
| 2022/0138151 A1* | 5/2022 | Yelheri | ................. | G06F 16/183 707/639 |
| 2022/0217149 A1* | 7/2022 | Spurlock | ................. | G06F 21/10 |
| 2023/0153449 A1* | 5/2023 | Li | ........................ | G06F 21/6218 726/4 |

* cited by examiner

*Primary Examiner* — Joe Chacko
(74) *Attorney, Agent, or Firm* — Hartman & Citrin LLC

(57) ABSTRACT
According to one aspect of the concepts and technologies disclosed herein, a system can separate permissions, rules, and controls into a discrete intermediate layer of a universal conceptual control management hierarchy as control objects. The system can define at least one interaction for each of the control objects. The system can assign resources to the control objects. A first control object of the control objects can be a low-level control object that encompasses the at least one interaction with a specific resource of the resources. A second control object of the control objects can be a sub-object of the first control object. The second control object can have a restriction. The restriction can be applied on top of the second control object. The restriction alternatively can be chained to the second control object with an additional restriction.

20 Claims, 9 Drawing Sheets

200

START

202

SEPARATE PERMISSIONS, RULES, AND CONTROLS
INTO DISCRETE INTERMEDIATE LAYER AS
INDEPENDENT CONTROL OBJECTS

204

DEFINE INTERACTIONS FOR CONTROL OBJECTS

206

ASSIGN USERS/CLIENTS TO CONTROL OBJECTS;
ESTABLISH PERMISSIONS

208

ASSIGN RESOURCES TO CONTROL OBJECTS

210

END

UNIVERSAL CONCEPTUAL CONTROL MANAGEMENT

BACKGROUND

The current approach to access management often includes granting a specific user precise access to particular resources. A level of indirection might exist in the process. For example, permissions may be granted to a group, and then users may be assigned to that group. As another example, labels may be assigned to specific resources, and then permissions may be granted based upon the labels. Ultimately, however, the current approach utilizes a hard-coded user, permission, and resource triplet. This type of access management works if the numbers of users, resources, and permission types are sufficiently low, but as the number of elements involved increases, this type of access management becomes more and more complex. With a large number of users and resources, the number of governing rules tends to increase exponentially, and as a result, the system complexity needs to be reduced. This can lead to one of two extremes: (1) the system that defines rules is generalized, simplistic, and strict, and is easily managed but does not allow for much flexibility; or (2) the system becomes very complex allowing for more flexibility, but at the expense of requiring significant work to maintain and keep consistent. Another limitation of current systems is that these systems often require strict segmentation, down to having individual groups of resources governed by isolated and barely interacting systems. This can lead to the need to repeat rules and information.

SUMMARY

According to one aspect of the concepts and technologies disclosed herein, a system can separate permissions, rules, and controls into a discrete intermediate layer of a universal conceptual control management hierarchy as control objects. The system can define at least one interaction for each of the control objects. The system can assign resources to the control objects. A first control object of the control objects can be a low-level control object that encompasses the at least one interaction with a specific resource of the resources. A second control object of the control objects can be a sub-object of the first control object. The second control object can have a restriction. The restriction can be applied on top of the second control object. The restriction alternatively can be chained to the second control object with an additional restriction.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
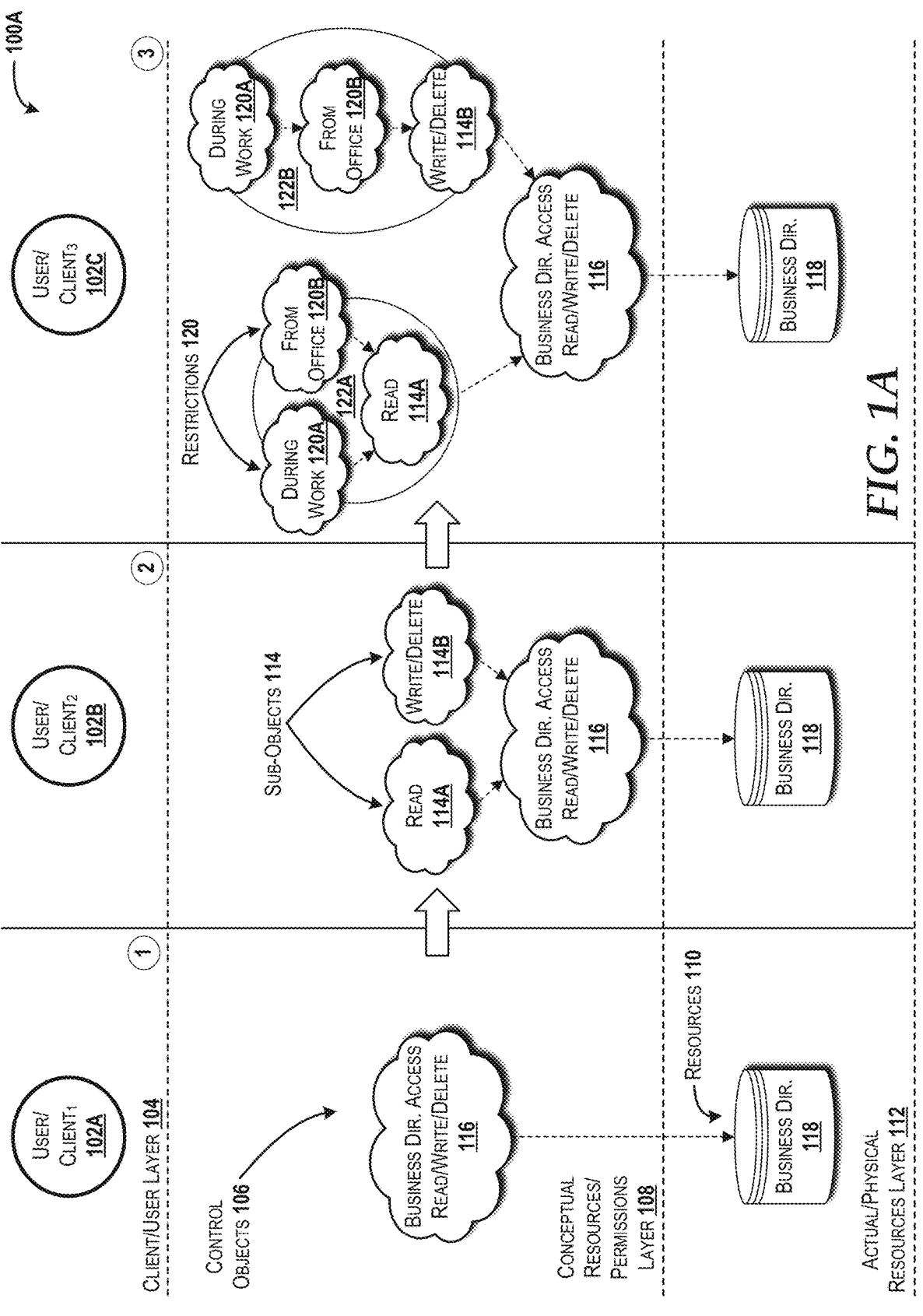
FIG. 1A is a block diagram illustrating a universal conceptual control management hierarchy, according to an illustrative embodiment of the concepts and technologies described herein.

More resources and data are being moved to and managed by cloud environments. There used to be closed network environments in which data and resources were within proximity of an enterprise. The cloud environment is quite different because access control is important but difficult to manage. The current rule of thumb is the principle of least privilege, but as resources and users are changing dynamically over time within the cloud environment, compliance with this principle is difficult. Thus, access control within the cloud environment needs a more dynamic solution.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein will be described.

Referring now to FIG. 1A, a block diagram illustrating aspects of an illustrative universal conceptual control management hierarchy ("hierarchy") 100A for various concepts disclosed herein will be described. It should be understood that the hierarchy 100A and the various components thereof have been greatly simplified for purposes of discussion. Accordingly, additional or alternative components of the hierarchy 100A can be made available without departing from the embodiments described herein.

The hierarchy 100A includes a first user/client (shown as "user/client₁") 102A, a second user/client (shown as "user/client₂") 102B, and a third user/client (shown as "user/client₃") 102C (referred to collectively as "users/clients" 102). The users/clients 102 are shown as part of a logical top layer (shown as "client/user layer 104"). The hierarchy 100A also includes rules and controls as independent control objects 106 in a discrete intermediate layer (shown as "conceptual resources/permissions layer 108"). Instead of permissions and rules binding users/clients directly to resources, both users/clients and resources can be assigned to specific control objects 106 in the conceptual resources/ permissions layer 108. In some embodiments, machine learning/artificial intelligence can simplify this process.

The control objects 106 within the conceptual resources/ permissions layer 108 can define what sort of interactions can be used with resources 110 (shown in an "actual/ physical resources layer 112") bound to each of the control objects 106. The control objects 106 can then grant permissions for access to those interactions to the clients/users 102 in the client/user layer 104. The control objects 106 behave similar to class objects in an object-oriented language paradigm, allowing for similar types of operations, such as inheritance, polymorphism, encapsulation, and/or the like. The control objects 106 can be classified/derived from other control objects 106, thereby creating sub-objects 114 allowing for subsets of interactions with associated resources 110. The control objects 106 can be defined to be flexible enough to fit any system or preference. The embodiment illustrated in FIG. 1 represents one non-limiting example implementation.

In the illustrated embodiment, the first column (1) includes a lowest-level control object 116 (shown as "Business Directory Access Read/Write/Delete) encompassing all possible interactions (i.e., read, write, and delete) with a business directory 118 resource. In the second column (2), instead of the user/client₂ 102B interacting directly with the low-level control object 116, two child/sub-objects 114A, 114B are derived from the lowest-level control object 116, each of which is limited to only specific interactions. In particular, the sub-object 114A is limited to a read interaction, and the sub-object 114B is limited to a write/delete interaction. The third column (3) shows that additional restrictions 120 can be applied on top of/chained to the sub-objects 114. For example, restriction 120A restricts the sub-object 114A ("Read") to "during work," and restriction 120B restricts the sub-object 114A ("Read") to "from office." The restrictions 120A/120B are illustrated on top of the sub-object 114A ("Read") in one configuration (shown generally as 122A). In another configuration (shown generally as 122B), the restrictions 120A/120B are illustrated in a chain with the sub-object 114B (i.e., 120A to 120B to 114B). Enforcing the restriction 120A and the restriction 120B within the chain shown in configuration 122B must be satisfied before the sub-object 114B ("Write/Delete") can be accessed.

The users/clients 102 access to the resources 110 depends on the control objects 106 that are granted to them. In some instances, the user/client 102 might have multiple control objects 106 associated with the same resource 110, each building a slightly different chain/path to the resource 110, and therefore defining different access permissions (e.g., read access during work hours or from office vs. write/delete access only from office and only during work hours).

With regard to the functionality of the control objects 106, each of the control objects 106 can bind to an item it operates on, such as a resource 110 or another control object 106. The control object 106 can be bound to either a user/client 102 or a preceding control object 106. Upon receiving a request, the control object 106 performs validation and passes the validation to the next item in the chain, if successful. If not successful, the control object 106 breaks operation and returns a reason back to the requestor (i.e., the user/client 102 in this example).

The control objects 106 can define more than one interface to other control objects 106, using internal logic to decide how to route requests. This can be done for a variety of purposes. The internal logic can group multiple permissions into a singular overarching permission object. The internal logic can create a restrictive interface granting only some part of access to another control object 116.

The end result is a set of permission definition chains that always start with a user/client 102 and end with a resource 110. Each link in the chain between the user/client 102 and the resource 110 defines exact interactions that can be performed and requirements for the interactions to occur. Each link in the chain is a control object 106 that would either describe how interactions can happen to either the resource 110 or another control object 106. Additionally, the control objects 106 can have multiple incoming and outgoing connections creating a network graph. An example network graph will be described below with reference to FIG. 1B.

In some embodiments, the hierarchy 100A can be established based upon a predefined template. The predefined template can be made for common cases and made readily available for customization and deployment. The predefined template can be made available publicly or kept private (e.g., within a business). The predefined template can be created over time through the use of machine learning/artificial intelligence.

The actual/physical resource layer 112 is agnostic to whether the resources 110 are located in physical, on-premises server racks (e.g., in a business's data center) or in a cloud environment hosted off-site. In either implementation, interaction interfaces should be made available to access the resources 110.

Figure 1B:
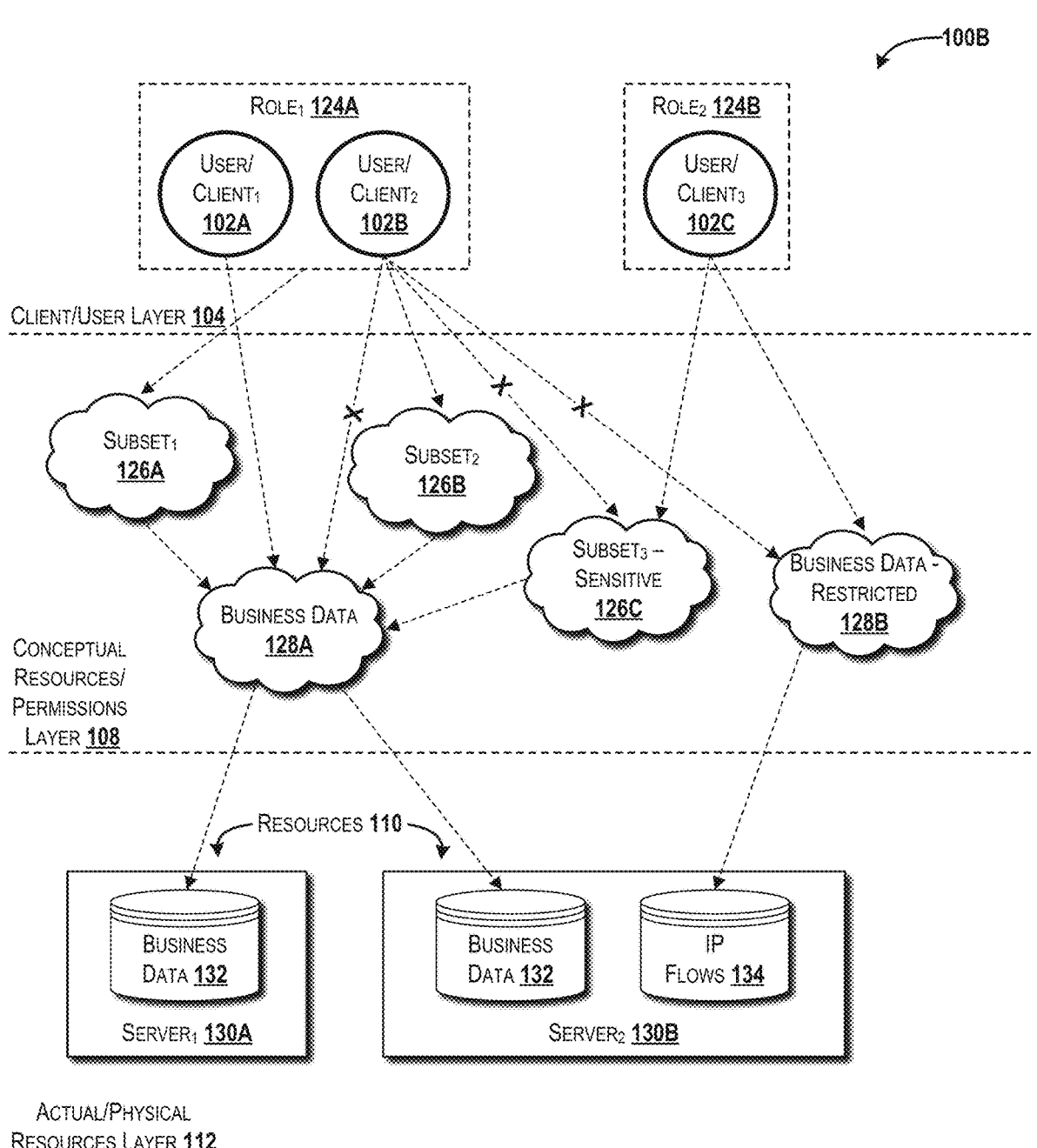
FIG. 1B is a block diagram illustrating an example network graph implementing the universal conceptual control management hierarchy, according to an illustrative embodiment of the concepts and technologies described herein.

Moreover, due to the nature of representing interactions of the control objects 106 as part of a graph network (e.g., as shown in FIG. 1B), the application of machine learning or deep learning algorithms can be quickly adopted. For example, initial use of machine learning may be limited to anomaly detection (e.g., duplication, contradictions, stale permissions, or the like). However, after further use, more complex algorithms would be applicable, starting, for example, with simple/standard recommendation algorithms and eventually, once enough data available, using inference to define new control object chains.

The hierarchy 100A provides several advantages over existing control management schemes. Firstly, controls are fully decoupled from both the clients/users 102 and the resources 110, allowing for much greater flexibility and mailability. Since the control objects 106 exist on a separate layer (i.e., the conceptual resources/permissions layer 108), any modification within that layer can be done without affecting other layers. For example, actions such as permission deduplication would just require identification, comparison, and merger of two control objects 106. Both the users/clients 102 and the resources 110 would be unaffected since the resources 110 would just be reconnected to new control objects 106 at the conclusion, before old control objects 106 are decommissioned, without loss of services. The inverse, splitting a single control object 106 into sub-objects 114, is equally as straight forward. Another example is restricting the users/clients 102 that need to have privileges. When the user/client 102 needs to be restricted to a lower subset of privileges, an interface with that subset can be derived from an overarching control object 106 and the user/client 102 can be seamlessly transferred over to that control object 106. Moreover, the fact that the overall control objects 106 are connected into a graph network lends itself to multiple analyses, including, but not limited to, using machine learning/deep learning algorithms with goals of inference, optimization, and anomaly detection.

Turning now to FIG. 1B, a block diagram illustrating an example network graph 100B implementing the universal conceptual control management hierarchy 100A will be described, according to an illustrative embodiment of the concepts and technologies described herein. The illustrated network graph 100B includes the client/user layer 104 with two roles 124A/124B. Each of the roles 124A/124B can include one or more of the users/clients 102. The $role_1$ 124A includes the user/$client_1$ 102A and the user/$client_2$ 102B. The $role_2$ 124B includes the user/$client_3$ 102C. The $role_1$ 124A has an interaction with a first subset ("$subset_1$") 126A in the conceptual resources/permissions layer 108 of the network graph 100B. The user/$client_1$ 102A has a direct interaction with a business data control object 128A (shown as "business data"). The $role_1$ 124A also has an interaction with the business data control object 128A through the $subset_1$ 126A. The user/$client_2$ 102B has direct interaction with a second subset ("$subset_2$") 126B, which, in turn, has an interaction with the business data control object 128A. The user/$client_2$ 102B does not have permission to interact directly with the business data control object 128A, a third subset marked sensitive ("$subset_3$-sensitive") 126C, and a restricted business data control object 128B. The $role_2$ 124B does not provide any specific role-level interactions. The user/$client_3$ 102C has direct interactions with both the $subset_3$-sensitive 126C and the restricted business data control object 128B (shown as "business data—restricted"). The business data control object 128A and the restricted business data control object 128B have access to resources 110 in the actual/physical resources layer 112. Specifically, a first server ("$server_1$") 130A is shown hosting an instance of business data 132 and a second server ("$server_2$") 130B is also shown hosting an instance of business data 132 as well as IP flows 134. The example network graph 100B is a simplified example of how the hierarchy 100A can be used to provide universal conceptual control management.

Figure 2:
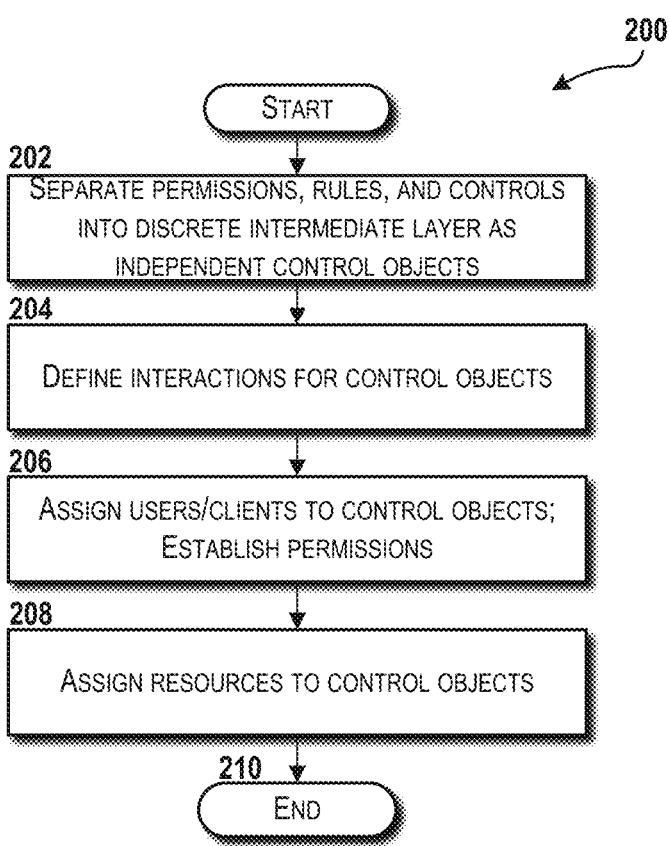
FIG. 2 is a flow diagram illustrating a method for creating a universal conceptual control management hierarchy, according to an illustrative embodiment of the concepts and technologies described herein.

Turning now to FIG. 2, a method 200 for creating a universal conceptual control management hierarchy (e.g., the hierarchy 100A) will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

The method 200 will be described as being performed by a system, which can be implemented on-site in embodiments in which the resources 110 are stored locally (e.g., on servers in server racks within a business's data center). An example computer system 400 capable of implementing the operations of the method 200 in these embodiments is illustrated and described herein with reference to FIG. 4. The system alternatively or additionally can be implemented within a cloud environment, which can be based upon an architecture the same as or similar to a virtualized cloud architecture 800 illustrated and described herein with reference to FIG. 8. Moreover, the system can include one or more processors capable of executing instructions that, when executed, perform operations of the method 200. The instructions may be part of a universal conceptual control management application (not shown).

The method 200 begins and proceeds to operation 202. At operation 202, the system separates permissions, rules, and controls into a discrete intermediate layer (i.e., the conceptual resources/permissions layer 108) as independent control objects 106. From operation 202, the method 200 proceeds to operation 204. At operation 204, the system defines interactions for the control objects 106. From operation 204, the method 200 proceeds to operation 206. At operation 206, the system assigns the users/clients 102 to the control objects 106. Also at operation 206, the system can establish permissions for the users/clients 102. From operation 206, the method 200 proceeds to operation 208. At operation 208, the system assigns the resources 110 to the control objects 106. From operation 208, the method 200 proceeds to operation 210. The method 200 can end at operation 210.

Figure 3:
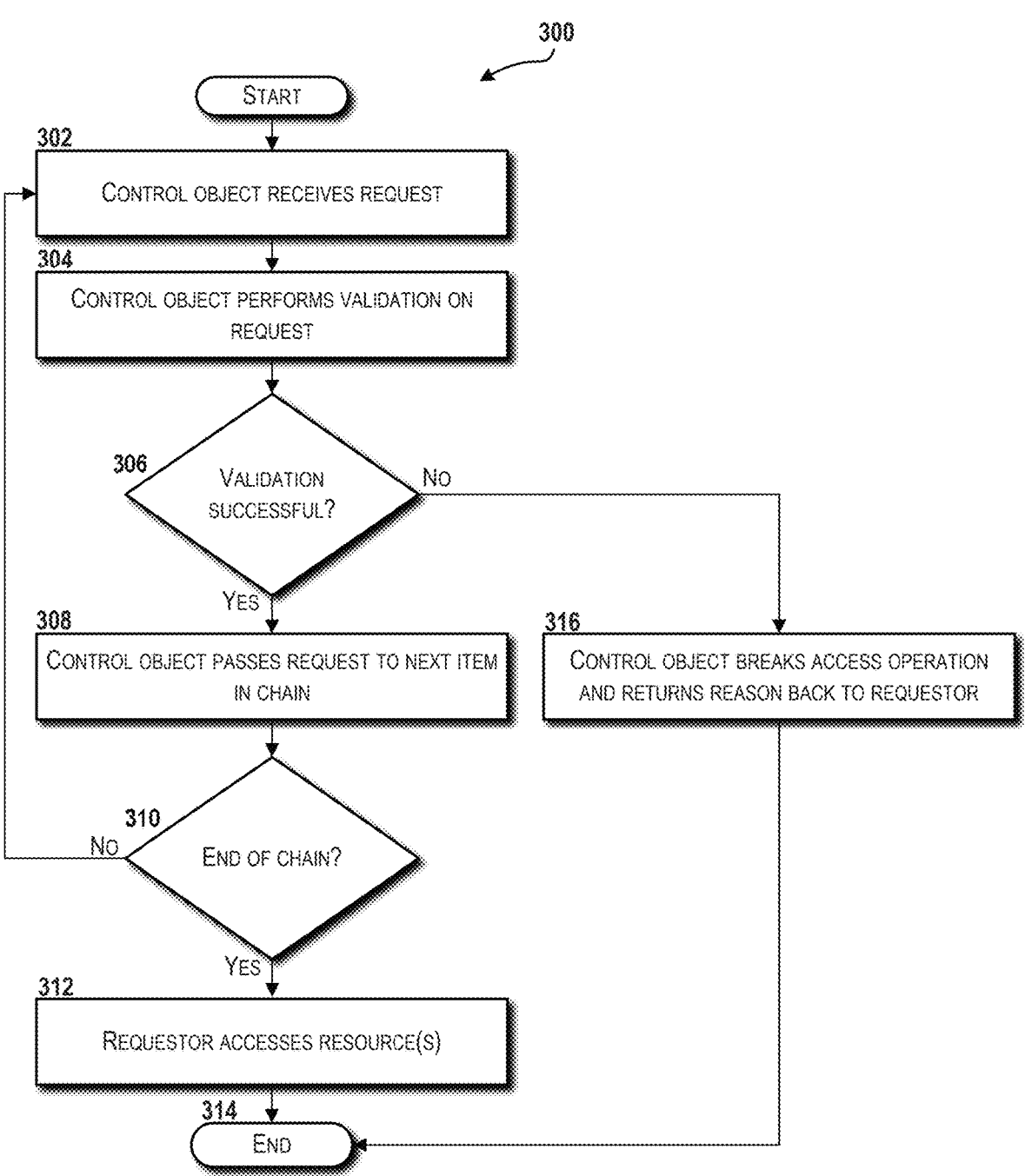
FIG. 3 is a flow diagram illustrating a method for implementing a universal conceptual control management hierarchy, according to an illustrative embodiment.

Turning now to FIG. 3, a method 300 for implementing a universal conceptual control management hierarchy (e.g., the hierarchy 100A) will be described, according to an illustrative embodiment. The method 300 begins and proceeds to operation 302. At operation 302, a control object 106 receives a request. From operation 302, the method 300 proceeds to operation 304. At operation 304, the control object 106 performs validation on the request. From operation 304, the method 300 proceeds to operation 306. At operation 306, the control object 106 determines whether the validation was successful. If so, the method 300 proceeds to operation 308. At operation 308, the control object 106 passes the request to the next item in the chain. From operation 308, the method 300 proceeds to operation 310. At operation 310, if the current control object 106 is the end of the chain before the resource 110, the method 300 proceeds to operation 312. At operation 312, the requestor (e.g., the client/user 102) accesses the resource(s) 110. From operation 312, the method 300 proceeds to operation 314. The method 300 can end at operation 314. Returning to operation 310, if the current control object 106 is not the end of the chain before the resource 110, the method 300 returns to operation 302. Returning to operation 306, if the validation is not successful, the method 300 proceeds to operation 316. At operation 316, the control object breaks the access operation and returns a reason (optional) back to the requestor (e.g., the client/user 102). From operation 316, the method 300 proceeds to operation 314 and the method 300 can end.

Figure 4:
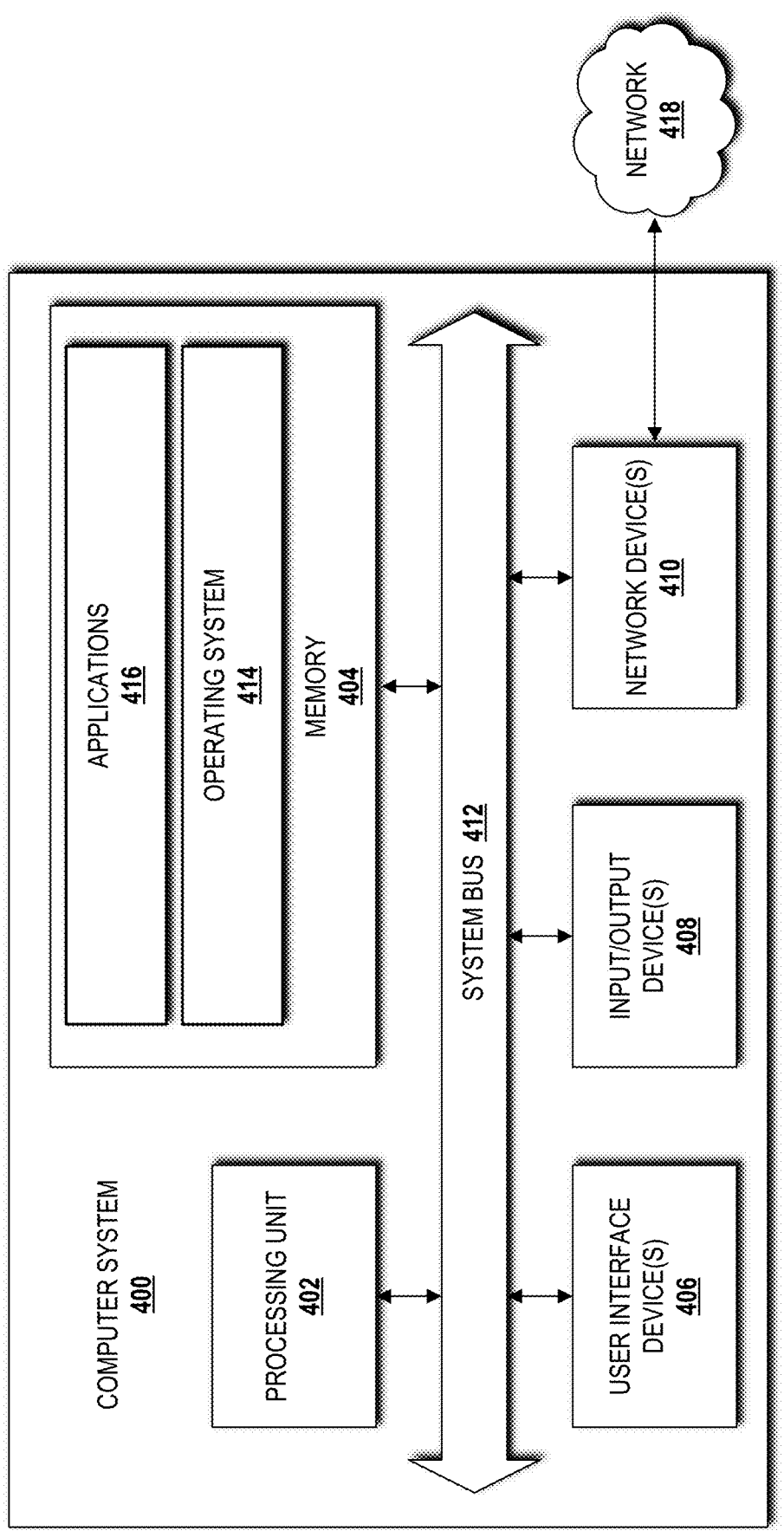
FIG. 4 is a block diagram illustrating an example computer system capable of implementing aspects of the embodiments presented herein.

Turning now to FIG. 4, a computer system 400 and components thereof will be described. The computer system 400 can implement the methods 200/300. An architecture similar to or the same as the computer system 400 can be used to implement various systems and/or devices disclosed herein, such as a client device/system (e.g., associated with the user 102) and/or the resource(s) 110.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 might be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416. The operating system 414 can include, but is not limited to, members of the WINDOWS family of operating systems from MICROSOFT CORPORATION, the LINUX family of operating systems, the MAC OSX and/or iOS families of operating systems from APPLE INC., other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer. An I/O device 408 embodied as a display screen can be used to present information.

The network devices 410 enable the computer system 400 to communicate with a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
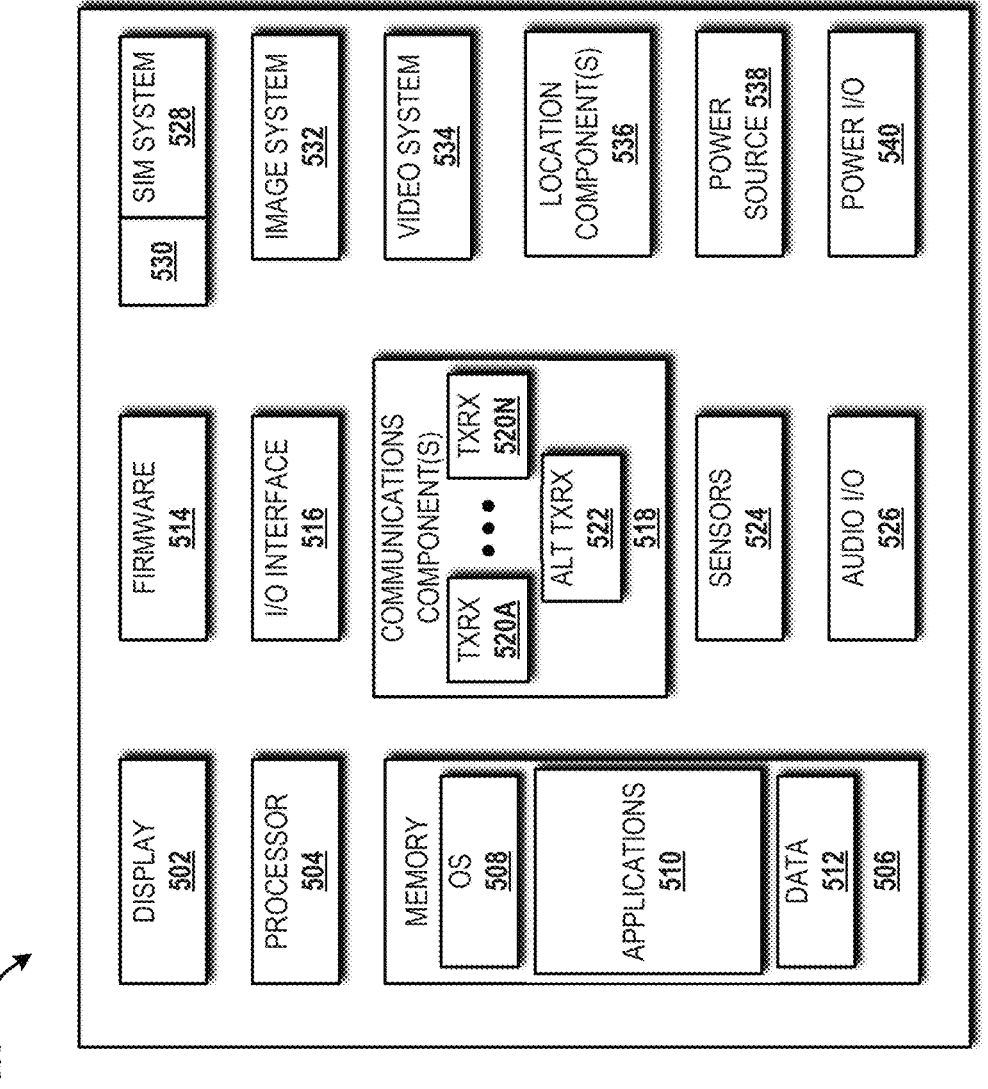
FIG. 5 is a block diagram illustrating an example mobile device capable of implementing aspects of the embodiments disclosed herein.

Turning now to FIG. 5, an illustrative mobile device 500 and components thereof will be described. In some embodiments, a client device/system (e.g., associated with the user 102) and/or the resource(s) 110 can be configured similar to or the same as the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network 418, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an N$^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
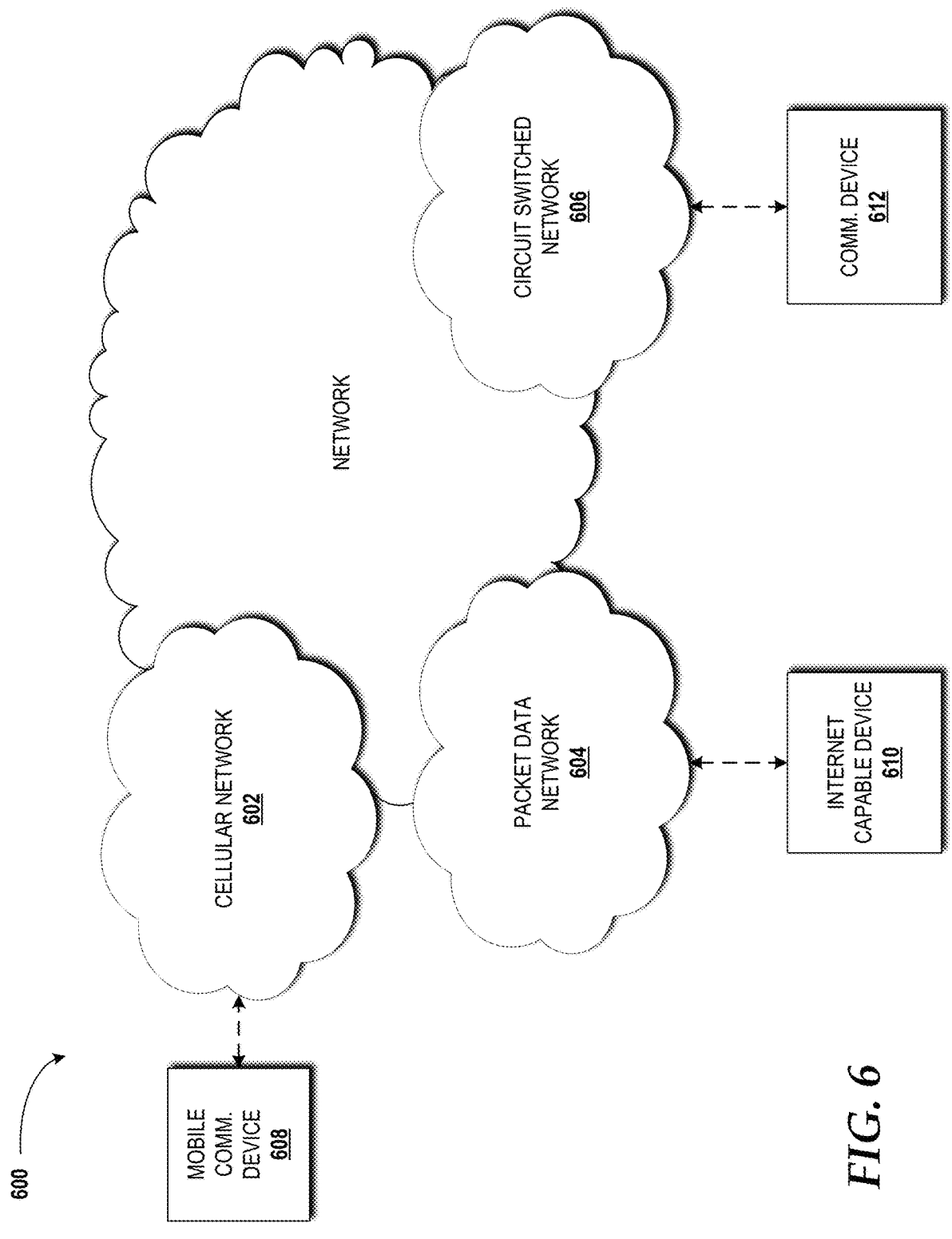
FIG. 6 is a block diagram illustrating an example network capable of implementing aspects of the concepts and technologies disclosed herein.

Turning now to FIG. 6, details of a network 600 are illustrated, according to an illustrative embodiment. The network 600 includes a cellular network 602, a packet data network 604, and a circuit switched network 606 (e.g., a public switched telephone network). The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the mobile device 500, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM) network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with 4G mobile communications standards such as LTE, or the like, as well as evolved and future mobile standards.

The packet data network 604 includes various systems, devices, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network

606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610 such as a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
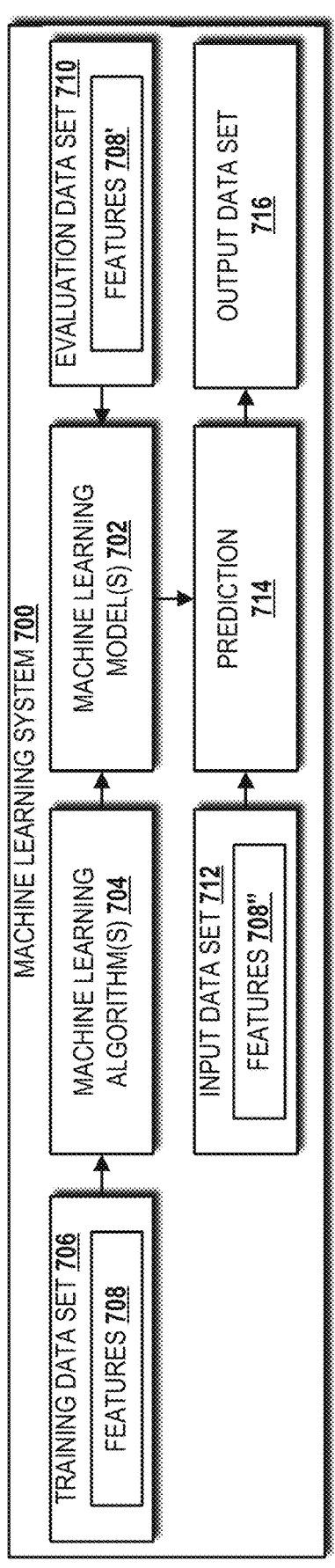
FIG. 7 is a block diagram illustrating an example machine learning system capable of implementing aspects of the concepts and technologies disclosed herein.

Turning now to FIG. 7, a machine learning system 700 capable of implementing aspects of the embodiments disclosed herein will be described. In some embodiments, the hierarchy 100A can be determined, at least in part, by the machine learning system 700 as described in further detail above. The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art. The training data in the training data sets 706.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
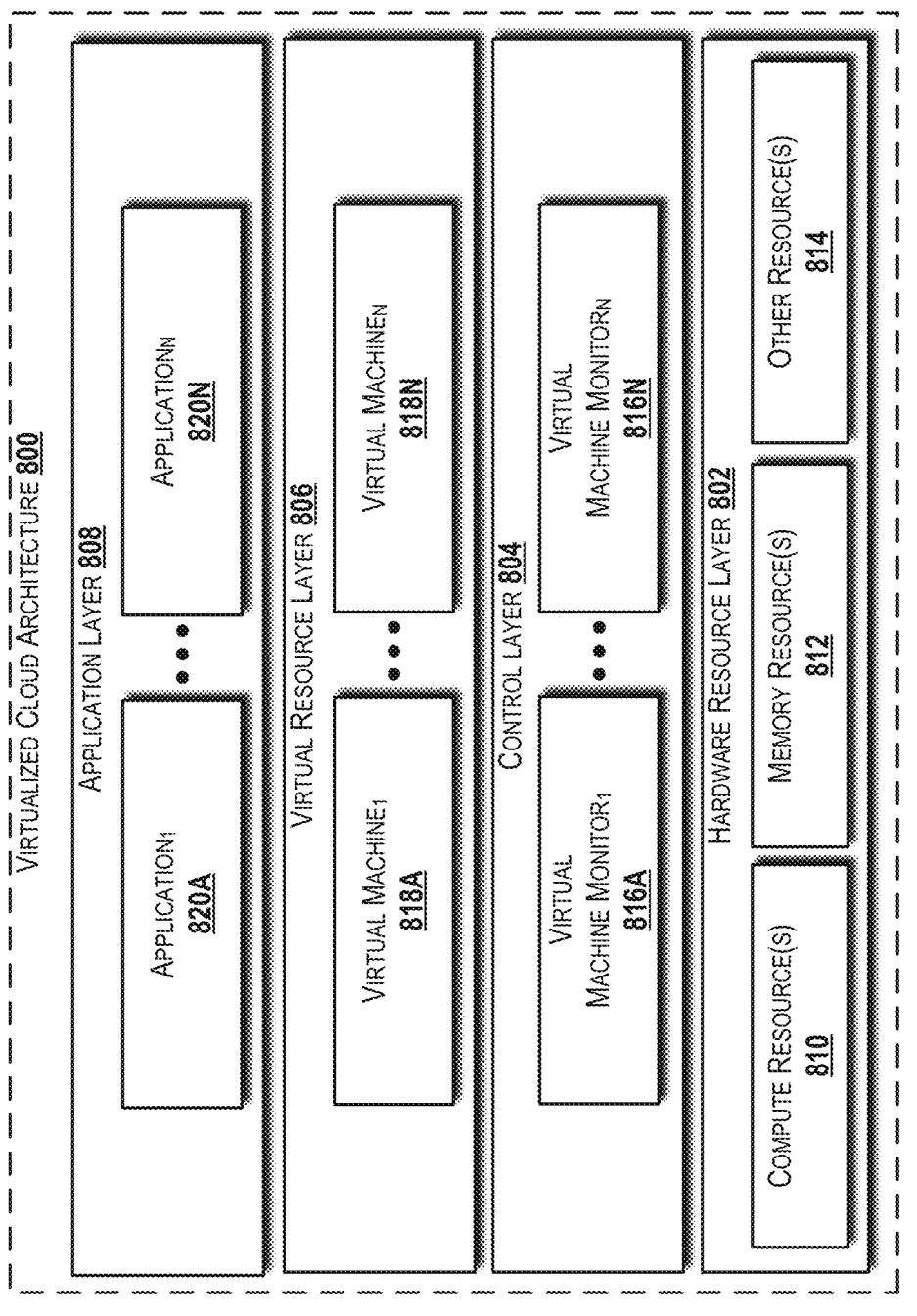
FIG. 8 is a block diagram illustrating an example virtualized cloud architecture and components thereof capable of implementing aspects of the embodiments presented herein.

Turning now to FIG. 8, a block diagram illustrating an example virtualized cloud architecture 800 and components thereof will be described, according to an exemplary embodiment. In some embodiments, the virtualized cloud architecture 800 can be utilized to implement the actual/physical resources layer 112 including the resource(s) 110. The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, California, and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 816A-816N (also known as "hypervisors;" hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Based on the foregoing, it should be appreciated that concepts and technologies for universal conceptual control management have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:

separating, by a system comprising a processor, permissions, rules, and controls associated with access control to resources to generate a plurality of control objects, wherein the plurality of control objects are included in a discrete intermediate layer of a universal conceptual control management hierarchy, and wherein the plurality of control objects are decoupled from the resources and from a client requesting access to at least one of the resources;

defining, by the system, for each of the plurality of control objects, at least one interaction that can be used with at least one of the resources;

assigning, by the system, a resource of the resources and the client to at least one of the plurality of control objects; and assigning, by the system, a first restriction and a second restriction to the at least one of the plurality of control objects, wherein the first restriction and the second restriction are assigned to the at least one of the plurality of control objects in a chain, and wherein the chain requires that the first restriction and the second restriction be satisfied before the at least one interaction of the at least one of the plurality of control objects can be accessed.

2. The method of claim 1, further comprising establishing, by the system, at least one of the permissions for the client, wherein the client operates in a top layer of the universal conceptual control management hierarchy.

3. The method of claim 1, wherein a first control object of the plurality of control objects is a low-level control object that comprises a plurality of interactions with a specific resource of the resources, wherein the plurality of interactions comprise a first interaction and a second interaction.

4. The method of claim 3, further comprising splitting the first control object into a first sub-object and a second sub-object, wherein the first sub-object is associated with the first interaction of the plurality of interactions and the second sub-object is associated with the second interaction of the plurality of interactions.

5. The method of claim 4, further comprising assigning a third restriction and a fourth restriction to the first sub-object.

6. The method of claim 5, wherein the third restriction and the fourth restriction are applied on top of the first sub-object.

7. The method of claim 5, wherein the third restriction is chained to the fourth restriction.

8. A system comprising:

a processor; and a memory comprising computer-executable instructions that, when executed by the processor, causes the processor to perform operations comprising separating permissions, rules, and controls associated with access control to resources to generate a plurality of control objects, wherein the plurality of control objects are included in a discrete intermediate layer of a universal conceptual control management hierarchy, and wherein the plurality of control objects are decoupled from the resources and from a client requesting access to at least one of the resources, defining, for each of the plurality of control objects, at least one interaction that can be used with at least one of the resources, assigning a resource of the resources and the client to at least one of the plurality of control objects, and assigning a first restriction and a second restriction to the at least one of the plurality of control objects, wherein the first restriction and the second restriction are assigned to the at least one of the plurality of control objects in a chain, and wherein the chain requires that the first restriction and the second restriction be satisfied before the at least one inter-action of the at least one of the plurality of control objects can be accessed.

9. The system of claim 8, wherein the operations further comprise establishing at least one of the permissions for the client, wherein the client operates in a top layer of the universal conceptual control management hierarchy.

10. The system of claim 8, wherein a first control object of the plurality of control objects is a low-level control object that comprises a plurality of interactions with a specific resource of the resources, wherein the plurality of interactions comprise a first interaction and a second inter-action.

11. The system of claim 10, wherein the operations further comprise splitting the first control object into a first sub-object and a second sub-object, wherein the first sub-object is associated with the first interaction of the plurality of interactions and the second sub-object is associated with the second interaction of the plurality of interactions.

12. The system of claim 11, wherein the operations further comprise assigning a third restriction and a fourth restriction to the first sub-object.

13. The system of claim 12, wherein the third restriction and the fourth restriction are applied on top of the first sub-object.

14. The system of claim 12, wherein the third restriction is chained to the fourth restriction.

15. A computer-readable storage medium comprising computer-executable instructions that, when executed by a processor, cause the processor to perform operations com-prising:

separating permissions, rules, and controls associated with access control to resources to generate a plurality of control objects, wherein the plurality of control objects are included in a discrete intermediate layer of a universal conceptual control management hierarchy, and wherein the plurality of control objects are decoupled from the resources and from a client request-ing access to at least one of the resources;

defining, for each of the plurality of control objects, at least one interaction that can be used with at least one of the resources;

assigning a resource of the resources to at least one of the plurality of control objects; and assigning a first restriction and a second restriction to the at least one of the plurality of control objects, wherein the first restriction and the second restriction are assigned to the at least one of the plurality of control objects in a chain, and wherein the chain requires that the first restriction and the second restriction be satis-fied before the at least one interaction of the at least one of the plurality of control objects can be accessed.

16. The computer-readable storage medium of claim 15, wherein the operations further comprise establishing at least one of the permissions for the client, wherein the client operates in a top layer of the universal conceptual control management hierarchy.

17. The computer-readable storage medium of claim 15, wherein a first control object of the plurality of control objects is a low-level control object that comprises a plu-rality of interactions with a specific resource of the resources, wherein the plurality of interactions comprise a first interaction and a second interaction.

18. The computer-readable storage medium of claim 17, wherein the operations further comprise splitting the first control object into a first sub-object and a second sub-object, wherein the first sub-object is associated with the first interaction of the plurality of interactions and the second sub-object is associated with the second interaction of the plurality of interactions.

19. The computer-readable storage medium of claim 18, wherein the operations further comprise assigning a third restriction and a fourth restriction to the first sub-object.

20. The computer-readable storage medium of claim 19, wherein:

the third restriction and the fourth restriction are applied on top of the first sub-object; or the third restriction is chained to the fourth restriction.

\* \* \* \* \*